United States Patent

Dever et al.

[15] 3,687,983
[45] Aug. 29, 1972

[54] PROCESS FOR PREPARING HALOGENATED CYCLOPENTADIENE DIADDUCTS OF FURAN

[72] Inventors: James L. Dever, Lewiston; Richard D. Carlson, Grand Island, both of N.Y.

[73] Assignee: Hooker Chemical Corporation, Niagara Falls, N.Y.

[22] Filed: Aug. 4, 1969

[21] Appl. No.: 847,408

[52] U.S. Cl. ..........................................260/346.2 M
[51] Int. Cl. ................................................C07d 5/44
[58] Field of Search ...............................260/346.2 M

[56] References Cited

UNITED STATES PATENTS 2,658,926  11/1953  Hyman et al...........260/649 R
3,356,688  12/1967  Mark...................260/346.2 M

OTHER PUBLICATIONS

Riemschneider, Chem. Abstracts (1962) Vol. 58, p. 11232g
Peri, Chem. Abstracts (1956) Vol. 50, p. 10013f Primary Examiner—Alex Mazel
Assistant Examiner—Bernard Dentz
Attorney—Peter F. Casella, Donald C. Studley, Richard P. Mueller, James F. Mudd and William J. Schramm

[57] ABSTRACT

A process is described for reacting furan derivatives with substituted cyclopentadiene compounds of the following structure

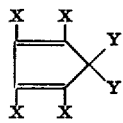

wherein X is a halogen selected from the group consisting of chlorine, bromine, fluorine and Y is a substituent selected from the group consisting of chlorine, bromine, fluorine, alkyl or alkoxy of one to 10 carbon atoms and halogen substituted alkyl or alkoxy of one to 10 carbon atoms. The compounds are useful as fire retardant additives for various polymers.

9 Claims, No Drawings

PROCESS FOR PREPARING HALOGENATED CYCLOPENTADIENE DIADDUCTS OF FURAN

BACKGROUND

Furan adducts have been difficult to prepare with good yields. An example of this problem is described in Chemical Abstracts Volume 50, page 10013 i wherein hexachlorocyclopentadiene was reacted with furan at about 130° centigrade, in a sealed tube. Yields of approximately 11 to 16 percent were obtained. Other references which disclose the reaction of hexachlorocyclopentadiene with furan are U.S. Pat. No. 2,658,926 wherein no yields are given and Chemical Abstracts Volume 58, page 11233 b wherein the mono adduct is described.

It is an object of the present invention to obtain significantly higher yields in preparing halogenated cyclopentadiene diadducts of furan.

SUMMARY OF THE INVENTION

Furan derivatives of the structure

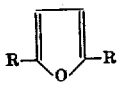

wherein each R is individually selected from the group consisting of hydrogen and alkyl of one to six carbon atoms are reacted with substituted cyclopentadienes of the following structure

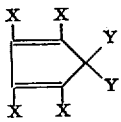

wherein X is a halogen selected from the group consisting of chlorine, bromine, and fluorine, and Y is a substituent selected from the group consisting of chlorine, bromine, fluorine, alkyl or alkoxy of one to 10 carbon atoms and halogen substituted alkyl or alkoxy of one to 10 carbon atoms. The proportions of reactants is at least two moles of halogenated cyclopentadiene to one mole of furan.

DESCRIPTION OF PREFERRED EMBODIMENTS

A furan derivative of the structure

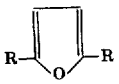

wherein R is selected from the group consisting of hydrogen and alkyl of one to six carbon atoms is reacted with a substituted cyclopentadiene of the structure

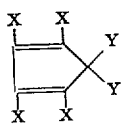

wherein X is a halogen selected from the group consisting of chlorine, bromine, and fluorine and Y is selected from the group consisting of chlorine, bromine, fluorine, and alkyl or alkoxy of one to 10 carbon atoms and halogen substituted alkyl or alkoxy of one to 10 carbon atoms, preferably alkyl, alkoxy, halogenated alkyl or halogenated alkoxy of one to six carbon atoms. The most preferred embodiment is hexachlorocyclopentadiene. Other preferred embodiments are when X and Y are bromine and fluorine. In order to simplify discussion in the specification, reference will be made to furan and hexachlorocyclopentadiene. Other halogenated cyclopentadienes or furan derivatives could also be used in their respective place.

A relatively cool liquid mixture of furan and hexachlorocyclopentadiene can be prepared. A mixture of two moles of hexachlorocyclopentadiene and one mole of furan melts between −30° and 0° C. A preferred temperature range for the liquid is about −10° C. to about 40° C., with the most preferred from about 10° to about 30° C. For economic reasons room temperature is the most practical temperature. This cool mixture is then added to a heated solvent. the addition reaction takes place when the mixture is added to the heated solvent. The reaction temperature employed may be from about 70° centigrade to about 200° centigrade, preferably about 130° centigrade to about 190° centigrade, and even more preferably from about 140° to about 180° centigrade.

Solvents that may be employed are those which are inert or do not react with the reactants such as chlorinated aliphatics of one to six carbon atoms such as perchloroethylene, trichloroethylene, carbontetrachloride, 1,2, dichloropropane, etc.

The particular solvent to be employed will vary with the desired reaction temperature. Solvents that may be usable at the lower end of the temperature range may not be usable at the upper end of the range. It is within the scope of this invention that a solvent is operable if it is a liquid at any portion of the reaction temperature range.

Other solvents that may be employed are aromatic solvents such as benzene, toluene, xylene, etc.; lower aliphatic solvents such as mineral spirits, heptane, 2-nitropropane, etc.; cyclic aliphatics of five to eight carbon atoms such as cyclohexane; di lower aliphatic ketones such as methyl isobutyl ketone; lower aliphatic acids and esters such as n-butyl acetate, acetic acid, etc., and lower aliphatic ethers such as Cellosolve (ethylene glycol mono ethyl ether) and ethyl Cellosolve (ethylene glycol diethyl ether).

On the other hand, the halogenated cyclopentadiene may be employed as a solvent as well as a reactant. In such a situation, the mixture of furan plus halogenated cyclopentadiene is added to the heated halogenated cyclopentadiene.

An addition reaction with furan should take into consideration the following parameters: (a) when higher temperatures are employed, significant coloring of the product may occur; (b) the higher the reaction temperature, the more furan will flash off; (c) when the temperature is increased there is a significant increase in the rate of reaction. By keeping all of the above parameters in mind, it was found best to add a relatively cool mixture (around room temperature) of halogenated cyclopentadiene and furan to the reaction solvent such as halogenated cyclopentadiene. Significantly high yields of about 85 to 90 percent are obtained compared with prior art methods of 11 to about 16 percent.

The ratio of reactants in the mixture and in the reaction vessel can vary within practical limitations. While a reactant mole ratio of 2:1 hexachlorocylcopentadiene:furan is the desired ratio, this can be accomplished by the cool mixture (prepared prior to addition to heated reaction zone) containing a 1:1 ratio and the reaction vessel containing the other mole of hexachlorocyclopentadiene. On the other hand, the cool pre-mixture may contain the desired 2:1 ratio of hexachlorocyclopentadiene:furan with the reaction vessel containing excess hexachlorocyclopentadiene. Hexachlorocyclopentadiene, in the latter situation, may be present in the reaction vessel in amounts from about 0.5 mole to about six moles. This, therefore, would result in a molar ratio of reactants of from about 2.5 to about eight moles of hexachlorocyclopentadiene per mole of furan.

It is also with the scope of the invention to add furan directly to heated halogenated cyclopentadiene. The latter may be mixed with an inert solvent described above. The mixture of furan derivative and halogenated cyclopentadiene may be added to the reaction solvent over a period of 2 to 48 hours, preferably 6 to 24 hours.

Some of the halogenated cyclopentadienes that may be employed are as follows: hexahalocyclopentadiene such as hexachlorocyclopentadiene, hexafluorocyclopentadiene, hexabromocyclopentadiene, pentachloromonobromocyclopentadiene, tetrachlorodibromocyclopentadiene, etc.; pentahalomonoalkylcyclopentadienes, such as pentachloromethylcyclopentadiene; pentabromomethylcyclopentadiene, tetrahalodialkylcyclopentadiene, such as tetrachlorodimethylcyclopentadiene, tetrabromodimethylcyclopentadiene; some of the alkoxy cyclopentadienes that may be employed are pentahaloalkoxycyclopentadiene such as pentachloromethoxycyclopentadiene and pentabromoethoxycyclopentadiene; tetrahalodialkoxycyclopentadiene such as tetrachlorodimethoxy, tetrachlorodiethoxy, tetrachlorodipropoxy, tetrachlorodibutoxy, tetrachlorodipentoxy or tetrachlorodihexoxycyclopentadiene.

Some of the furan derivatives that could be employed are:

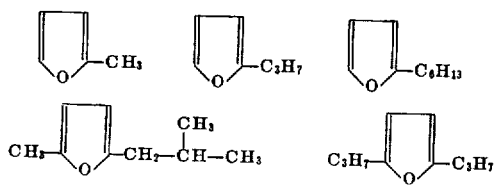

Some of the halogen substituted alkyl cyclopentadienes are:

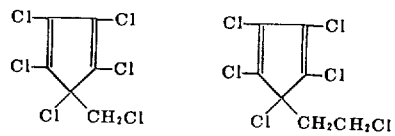

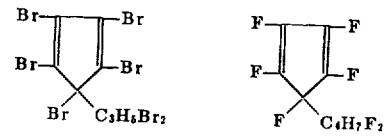

Some of the halogen substituted alkoxy cyclopentadienes are:

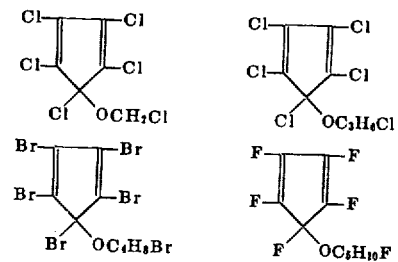

Having described above in general the parameters of the invention, listed below are examples which describe preferred embodiments.

EXAMPLE I

A 2 liter, three-necked flask was equipped with a stirrer, thermometer, addition funnel and a water condenser on top of which was placed a dry-ice condenser. The flask was placed under a nitrogen atmosphere and charged with 820g of hexachlorocyclopentadiene which was then heated to 150° C. A solution of 68g of furan in 546g of hexachlorocyclopentadiene was then added slowly maintaining a reaction mixture temperature of 150° C. After about 5 hours approximately one-half of the furan solution had been added and crystals were evident in the reaction mixture.

Due to the temperature of the reaction mixture, some furan vaporized. However, it was maintained in the system by condensing it in the water and dry ice condensers. One drop of furan from the dry-ice condenser fell into the reaction zone every 10–15 minutes, indicating that furan was reacting almost as fast as it was added.

After completion of the addition the mixture was held at 150° C. for about 4 hours and then allowed to cool to room temperature. The crystals were filtered off, extracted with xylene and isopropyl alcohol, and dried to give 539g of product with a melting point of 293° C. determined by differential thermal analysis.

Cacld. for $C_{14}H_4Cl_{12}O$; 69.3 percent Cl. Found: 68.8 percent Cl. Yield was calculated at 88 percent based on furan.

The apparatus for the above example was open to atmospheric pressure, i.e., no additional pressure was applied nor was the system sealed.

Similarly good yields may be obtained of

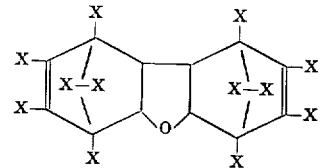

wherein X is bromine, and

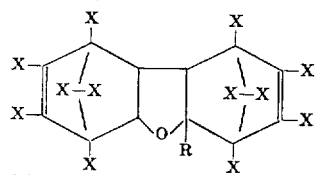

wherein X = chlorine and

R = —CH₃.

The above compounds are useful as fire retardant additives for various plastics and elastomers, such as ABS resins, butyl rubber, SBR (styrene butadiene rubber) and EPDM (ethylene propylene diene monomer).

Some of the plastic polymer compositions in which the fire retardant additive can be employed are described in U.S. Pat. No. 3,403,036. The additives can be employed with or without additional additives such as phosphorus compounds, antimony compounds or others likewise described in the above mentioned U.S. patent.

The use of the compounds of the above process are described in Ser. No. 847,430 filed on even data herewith and now abandoned.

We claim:

1. A process for preparing a halogenated cyclopentadiene diadduct of furan comprising slowly, over a period of 2 to 48 hours adding a liquid mixture comprised of a furan derivative of the structure

wherein R is independently selected from the group consisting of hydrogen and alkyl of one to six carbon atoms and a halogenated cyclopentadiene of the structure

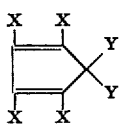

wherein X is a halogen selected from the group consisting of fluorine, chlorine and bromine; Y is a substituent selected from the group consisting of fluorine, chlorine, bromine, alkyl of one to 10 carbon atoms, alkoxy of one to 10 carbon atoms, halogen substituted alkyl of one to 10 carbon atoms and halogen substituted alkoxy of one to 10 carbon atoms, to a reaction solvent which is maintained at about 70° centigrade to about 200° centigrade, and under atmospheric pressure wherein the ratio of reactants is at least two moles of halogenated cyclopentadiene per mole of furan derivative.

2. The process of claim 1 wherein the halogenated cyclopentadiene is hexachlorocyclopentadiene.

3. The process of claim 1 wherein the liquid mixture is maintained at a temperature from about −10° to about 40° centigrade, the ratio of reactants in the liquid mixture is at least two moles of halogenated cyclopentadiene per mole of furan derivative.

4. The process of claim 1 wherein hexachlorocyclopentadiene is both the solvent and the reactant, the mixture of hexachlorocyclopentadiene and furan is maintained at approximately 25° centigrade, and the reaction temperature is between about 130° to about 180° centigrade.

5. The process of claim 1 wherein hexachlorocyclopentadiene and furan are the reactants, the reaction temperature is from about 140° to about 180° centigrade, and the amount of reactants employed is at least two moles of hexachlorocyclopentadiene per mole of furan.

6. The process of claim 1 wherein X is chlorine or bromine and Y is chlorine or bromine.

7. A process for preparing a halogenated cyclopentadiene diadduct of furan comprising slowly, over a period of 2 to 48 hours adding a furan derivative of the structure

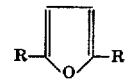

wherein R is independently selected from the group consisting of hydrogen and alkyl of one to six carbon atoms to a halogenated cyclopentadiene of the structure

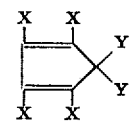

wherein X is halogen selected from the group consisting of chlorine, bromine and fluorine, Y is a substituent selected from the group consisting of chlorine, bromine, fluorine, alkyl of one to 10 carbon atoms, halogen substituted alkyl of one to 10 carbon atoms, alkoxy of one to 10 carbon atoms and halogen substituted alkoxy of one to 10 carbon atoms, at a temperature of 140° to about 200° centigrade, and under atmospheric pressure.

8. The process of claim 7 wherein the temperature is from 140° to about 180° centigrade.

9. In the preparation of the diadduct of a furan compound of the formula

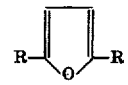

wherein R is independently selected from the group consisting of hydrogen and alkyl of one to six carbon atoms, and a halogenated cyclopentadiene of the formula

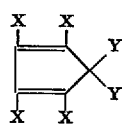

wherein X is a halogen selected from the group consisting of chlorine and bromine and Y is a substituent selected from the group consisting of fluorine, chlorine, bromine, alkyl of one to 10 carbon atoms, alkoxy of one to 10 carbon atoms, and halogen substituted alkoxy of one to 10 carbon atoms, wherein at least two moles of the halogenated cyclopentadiene per mole of furan compound are reacted at an elevated temperature and under atmospheric pressure, the improvement which comprises the steps of a. forming a mixture of the halogenated cyclopentadiene and furan compound containing at least two moles of the halogenated cyclopentadiene per mole of furan compound at a temperature from about −10° centigrade to about 40° centigrade, and b. slowly adding, over a period of 2 to 48 hours said mixture to a reaction solvent which is maintained at about 70° centigrade to about 200° centigrade.

* * * * *